United States Patent
Chavali

(10) Patent No.: US 7,418,519 B1
(45) Date of Patent: Aug. 26, 2008

(54) TECHNIQUE FOR PREFIX LIMIT EXCHANGE FOR ROUTE ADVERTISEMENT

(75) Inventor: Srikanth Chavali, North Chelmsford, MA (US)

(73) Assignee: Nortel Networks Limited, St. Laurent, Ontario (CA)

( * ) Notice: Subject to any disclaimer, the term of this patent is extended or adjusted under 35 U.S.C. 154(b) by 1159 days.

(21) Appl. No.: 10/669,252

(22) Filed: Sep. 25, 2003

Related U.S. Application Data

(60) Provisional application No. 60/474,015, filed on May 29, 2003.

(51) Int. Cl.
G06F 15/16 (2006.01)
G06F 15/177 (2006.01)
G06F 15/173 (2006.01)

(52) U.S. Cl. .................. 709/242; 709/220; 709/228; 709/230

(58) Field of Classification Search ......... 709/217–242; 370/229–240
See application file for complete search history.

(56) References Cited

U.S. PATENT DOCUMENTS

| | | | | |
|---|---|---|---|---|
| 6,385,170 B1* | 5/2002 | Chiu et al. | .................. | 370/235 |
| 6,483,833 B1* | 11/2002 | Jagannath et al. | ........... | 370/392 |
| 6,718,396 B1* | 4/2004 | Maejima et al. | ............. | 709/249 |
| 6,728,782 B1* | 4/2004 | D'Souza et al. | ............. | 709/242 |
| 6,768,739 B1* | 7/2004 | Kobayashi et al. | .......... | 370/392 |
| 6,868,388 B1* | 3/2005 | Millsap et al. | ................. | 705/7 |
| 6,965,937 B2* | 11/2005 | Gaddis et al. | ............... | 709/227 |
| 7,039,687 B1* | 5/2006 | Jamieson et al. | ............. | 709/220 |
| 7,136,374 B1* | 11/2006 | Kompella | .................... | 370/352 |
| 7,369,556 B1* | 5/2008 | Rekhter et al. | ............... | 370/392 |
| 2002/0069278 A1* | 6/2002 | Forslow | ....................... | 709/225 |
| 2002/0069292 A1* | 6/2002 | Gaddis et al. | ............... | 709/238 |
| 2002/0078223 A1* | 6/2002 | Baldonado et al. | .......... | 709/232 |
| 2003/0021232 A1* | 1/2003 | Duplaix et al. | .............. | 370/238 |
| 2003/0103456 A1* | 6/2003 | Hodgkinson | ................. | 370/230 |
| 2003/0140167 A1* | 7/2003 | Harvey et al. | ............... | 709/238 |
| 2003/0174717 A1* | 9/2003 | Zabarski et al. | ............. | 370/401 |
| 2003/0231587 A1* | 12/2003 | Sankaran et al. | ............ | 370/230 |
| 2004/0081154 A1* | 4/2004 | Kouvelas | ..................... | 370/392 |

(Continued)

OTHER PUBLICATIONS

"BGP Restart Session After Max-Prefix Limit", Cisco Systems, http://www.cisco.com/univercd/cc/td/doc/product/software/ios122/122newft/122t/122t15/ftbrsamp.htm; Aug. 21, 2003.*

(Continued)

Primary Examiner—Joseph E Avellino
(74) Attorney, Agent, or Firm—Hunton & Williams LLP

(57) ABSTRACT

A technique for prefix limit exchange for route advertisement is disclosed. In one particular exemplary embodiment, the technique may be realized as a method for prefix limit exchange for route advertisement. The method comprises communicating a prefix limit from a first element to a second element, wherein the first element and the second element are routing neighbors in a network. The method also comprises advertising a plurality of routes from the second element to the first element. The method further comprises recording, at the second element, a number of the plurality of routes that the second element has advertised to the first element. The method additionally comprises suspending route advertisement from the second element to the first element when the number is the same as or greater than the prefix limit.

15 Claims, 3 Drawing Sheets

U.S. PATENT DOCUMENTS

| | | | |
|---|---|---|---|
| 2004/0085961 A1* | 5/2004 | Coffell et al. | 370/392 |
| 2004/0111529 A1* | 6/2004 | Parmar | 709/245 |
| 2004/0193619 A1* | 9/2004 | Venkatachary et al. | 707/100 |
| 2004/0249803 A1* | 12/2004 | Vankatachary et al. | 707/3 |
| 2005/0047353 A1* | 3/2005 | Hares | 370/255 |
| 2006/0198322 A1* | 9/2006 | Hares | 370/254 |
| 2006/0221971 A1* | 10/2006 | Andrieux et al. | 370/392 |

OTHER PUBLICATIONS

Rekhter, Y., and T. Li, "A Border Gateway Protocol 4 (BGP-4)", RFC 1771, Mar. 1995 ftp://ftp.rfc-editor.org/in-notes/rfc1771.txt.

Chandra, R., Scudder, J., "Capabilities Advertisement with BGP-4", rfc 2842, May 2000 ftp://ftp.rfc-editor.org/in-notes/rfc2842.txt.

Chen, E., "Route Refresh Capability for BGP-4", RFC 2918, Sep. 2000 ftp://ftp.rfc-editor.org/in-notes/rfc2918.txt.

Patel, K., Hares, S. "Aspath Based Outbound Route Filter for BGP-4", Internet Draft http://www.ietf.org/internet-drafts/draft-ietf-idr-aspath-orf-05.txt.

Chen, E., Rekhter, Y., "Cooperative Route Filtering Capability for BGP-4", Internet Draft http://www.ietf.org/internet-drafts/draft-ietf-idr-route-filter-09.txt.

Chen, E., Sangli, S. R., "Dynamic Capability for BGP-4", Internet Draft http://www.ietf.org/internet-drafts/draft-ietf-idr-dynamic-cap-04.txt.

* cited by examiner

TECHNIQUE FOR PREFIX LIMIT EXCHANGE FOR ROUTE ADVERTISEMENT

CROSS-REFERENCE TO RELATED APPLICATIONS

This patent application claims priority to U.S. Provisional Patent Application No. 60/474,015, filed May 29, 2003, which is hereby incorporated by reference herein in its entirety.

FIELD OF THE INVENTION

The present invention relates generally to computer and communications networks and, more particularly, to a technique for prefix limit exchange for route advertisement.

BACKGROUND OF THE INVENTION

Routing is the act of moving information across a network from a source to a destination. In a complex network such as the Internet, information is typically relayed by a plurality of network elements located between the source and the destination. In order to achieve a fluent and efficient flow of information, it is crucial for these network elements to communicate and cooperate with one another.

A number of network protocols have been proposed and/or implemented to ensure proper communication and cooperation among network elements. For example, Border Gateway Protocol (BGP) is a routing protocol for exchanging network reachability information between neighboring gateways in different autonomous systems. For each autonomous system, there may be one or more network elements, known as "BGP speakers", that carry out the functions of receiving routes, storing routes, modifying routes and advertising routes to their counterparts in other autonomous systems. Due to certain limitations (e.g., system resource capacity), there is typically provisioned a maximum number of routes (i.e., "prefixes") that can be handled by a BGP speaker. Such maximum number may be referred to as a "prefix limit".

In current practice, if the number of routes received from a BGP peer exceeds a BGP speaker's prefix limit, a peering session between the BGP speaker and the BGP peer will be restarted or any heretofore advertised routes will be discarded. This practice results in overhead costs, such as unnecessary processing, network bandwidth usage and network service disruption to both BGP speakers involved in the peering session. The root cause of this problem is the inability of each individual BGP speaker to predict the prefix limits on its peers, which is an indeterministic condition. The cost of restarting the BGP peering session and/or re-advertising the route(s) is borne by both the BGP speaker and the BGP peer. Therefore, both of them need to assume responsibility in maintaining a stable peering session. Corrective action is needed by the offending BGP speaker in maintaining a stable BGP peering session.

Though it has been proposed that new protocol messages be introduced to solve this problem, this solution can lead to increased processing and undesired complexity in the routing protocol.

In view of the foregoing, it would be desirable to provide a technique for route advertisement which overcomes the above-described inadequacies and shortcomings. More particularly, it would be desirable to provide a technique for prefix limit exchange for route advertisement in an efficient and cost effective manner.

SUMMARY OF THE INVENTION

According to the present invention, a technique for prefix limit exchange for route advertisement is provided. In one particular exemplary embodiment, the technique may be realized as a method for prefix limit exchange for route advertisement. The method comprises communicating a prefix limit from a first element to a second element, wherein the first element and the second element are routing neighbors in a network. The method also comprises advertising a plurality of routes from the second element to the first element. The method further comprises recording, at the second element, a number of the plurality of routes that the second element has advertised to the first element. The method additionally comprises suspending route advertisement from the second element to the first element when the number is the same as or greater than the prefix limit.

In accordance with one aspect of this particular exemplary embodiment, the method may further comprise exchanging a prefix limit capability between the first element and the second element.

In accordance with another aspect of this particular exemplary embodiment, the method may also comprise recording, at the second element, at least one route withdrawal to the first element. The method may further comprise updating, based on the at least one route withdrawal, the number of the plurality of routes that the second element has advertised to the first element. The method may additionally comprise resuming the route advertisement from the second element to the first element.

In accordance with yet another aspect of this particular exemplary embodiment, the method may further comprise communicating an increased prefix limit from the first element to the second element without resetting a peering session between the first element and the second element, and resuming the route advertisement from the second element to the first element until the number of the plurality of routes that the second element has advertised to the first element is the same as or greater than the increased prefix limit.

In accordance with still another aspect of this particular exemplary embodiment, the method may further comprise communicating a decreased prefix limit from the first element to the second element without resetting a peering session between the first element and the second element, and suspending the route advertisement from the second element to the first element when the number of the plurality of routes that the second element has advertised to the first element is the same as or greater than the decreased prefix limit.

In accordance with a further aspect of this particular exemplary embodiment, the method may also comprise subjecting the plurality of routes to one or more route filters negotiated between the first element and the second element.

In accordance with a still further aspect of this particular exemplary embodiment, the first element and the second elements may be routing neighbors in a network implementing Border Gateway Protocol (BGP).

In accordance with another exemplary embodiment, the technique may be realized as at least one signal embodied in at least one carrier wave for transmitting a computer program of instructions configured to be readable by at least one processor for instructing the at least one processor to execute a computer process for performing the method as recited above.

In accordance with yet another exemplary embodiment, the technique may be realized as at least one processor readable carrier for storing a computer program of instructions configured to be readable by at least one processor for instructing the at least one processor to execute a computer process for performing the method as recited above.

In accordance with still another exemplary embodiment, the technique may be realized by a system for prefix limit exchange for route advertisement. The system comprises means for communicating a prefix limit from a first element to a second element, wherein the first element and the second element are routing neighbors in a network. The system also comprises means for advertising a plurality of routes from the second element to the first element. The system further comprises means for recording, at the second element, a number of the plurality of routes that the second element has advertised to the first element. The system additionally comprises means for suspending route advertisement from the second element to the first element when the number is the same as or greater than the prefix limit.

In accordance with one aspect of this particular exemplary embodiment, the system may further comprise means for exchanging a prefix limit capability between the first element and the second element.

In accordance with another aspect of this particular exemplary embodiment, the system may also comprise means for recording, at the second element, at least one route withdrawal to the first element. The system may further comprise means for updating, based on the at least one route withdrawal, the number of the plurality of routes that the second element has advertised to the first element. The system may additionally comprise means for resuming the route advertisement from the second element to the first element.

In accordance with yet another aspect of this particular exemplary embodiment, the system may further comprise means for communicating an increased prefix limit from the first element to the second element without resetting a peering session between the first element and the second element, and means for resuming the route advertisement from the second element to the first element until the number of the plurality of routes that the second element has advertised to the first element is the same as or greater than the increased prefix limit.

In accordance with still another aspect of this particular exemplary embodiment, the system may further comprise means for communicating a decreased prefix limit from the first element to the second element without resetting a peering session between the first element and the second element, and means for suspending the route advertisement from the second element to the first element when the number of the plurality of routes that the second element has advertised to the first element is the same as or greater than the decreased prefix limit.

In accordance with a further aspect of this particular exemplary embodiment, the system may also comprise means for subjecting the plurality of routes to one or more route filters negotiated between the first element and the second element.

In accordance with a still further aspect of this particular exemplary embodiment, the first element and the second elements may be routing neighbors in a network implementing Border Gateway Protocol (BGP).

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF EXEMPLARY EMBODIMENT(S)

In the detailed description set forth below, prefix limit exchange processes between two BGP routing neighbors are shown as exemplary embodiments of the present invention. However, it should be appreciated by those skilled in the relevant art that the technique for prefix limit exchange for route advertisement in accordance with the present invention applies to any number of network elements in any routing schemes or protocols.

Further, since route advertisement and prefix limit exchange are typically bilateral and somewhat symmetric processes between two BGP routing neighbors, for illustrative purposes, the following description will only focus on a situation where only one of them advertises routes and the other only receives routes. To clearly distinguish the roles of these two BGP routing neighbors, the one that advertises routes is referred to as "BGP speaker" and the other that receives routes is referred to as "BGP receiver". It should be noted that the present invention applies when both of the BGP routing neighbors advertise and receive routes.

Figure 1:
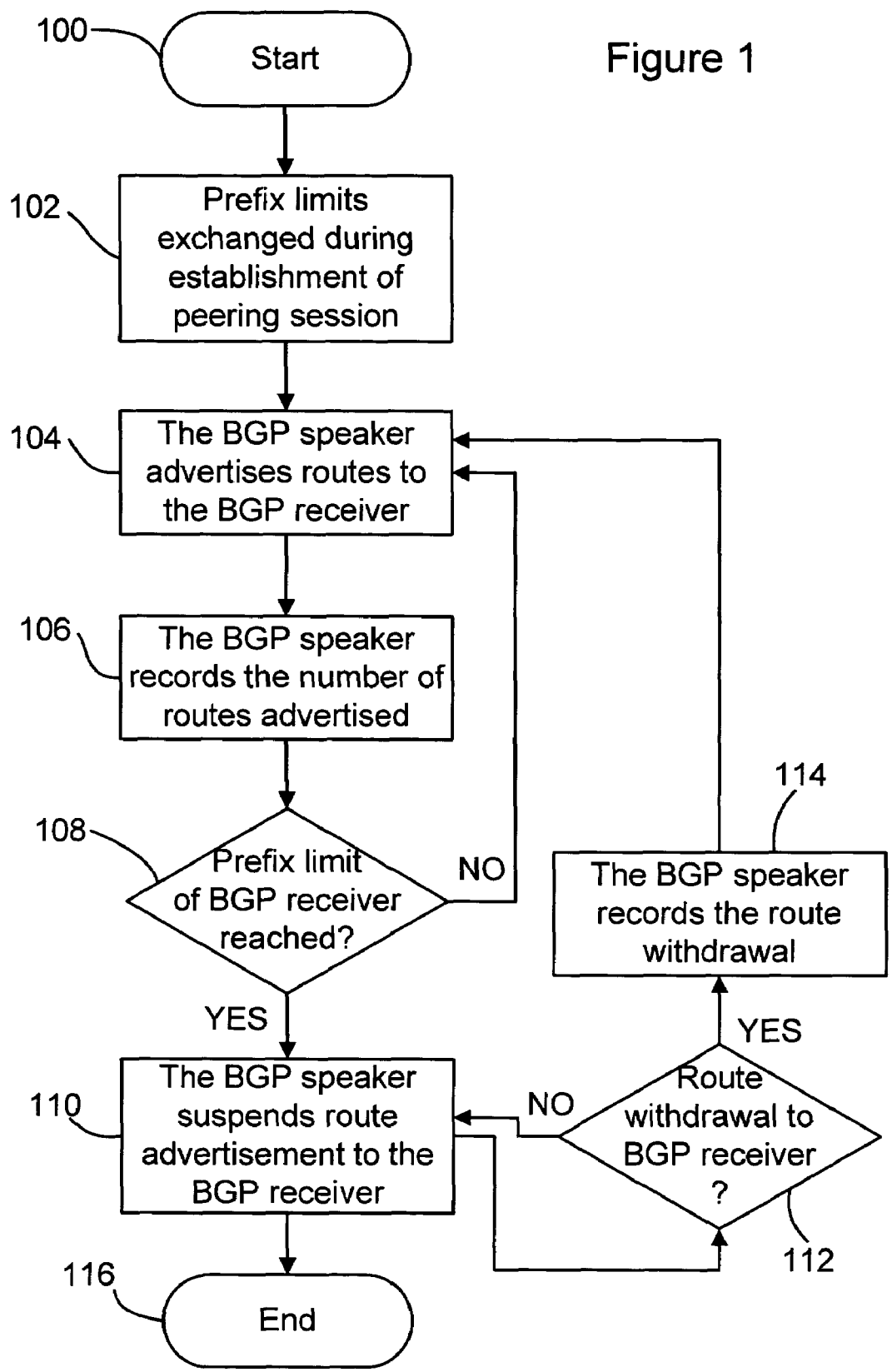
FIG. 1 is a flow chart illustrating an exemplary method for prefix limit exchange for route advertisement in accordance with the present invention.

Referring to FIG. 1, there is shown a flow chart illustrating an exemplary method for prefix limit exchange for route advertisement in accordance with the present invention.

The exemplary method starts at step 100.

At step 102, a BGP peering session may be started between two BGP routing neighbors. As mentioned above, they will be referred to as a "BGP speaker" and a "BGP receiver" in the following description. During the establishment of the peering session, the BGP speaker and the BGP receiver may exchange configured prefix limits. For the purpose of the following illustration, particularly the prefix limit of the BGP receiver is communicated to the BGP speaker.

A prefix limit is defined as the maximum number of routes that a particular BGP routing element can handle. In Border Gateway Protocol (BGP), a route is a unit of information that pairs a destination (typically identified by an IP address) with the attributes of a path to that destination. The routes are advertised, in BGP UPDATE messages, to instruct each BGP routing element where to direct a packet of information sent between neighboring gateways. If a previously advertised route becomes unavailable, it may be advertised in the WITHDRAWN ROUTES field of an UPDATE message. If a BGP routing element chooses to advertise a route, it may add to or modify the path attributes of the route before advertising it to a peer. Due to system resource capacities and sometimes due to human-imposed limitations, each BGP routing element is usually configured to handle up to a certain number of routes. If its prefix limit is exceeded, error(s) will occur.

The prefix limit of the BGP receiver may be communicated to the BGP speaker in a number of ways. For example, in Border Gateway Protocol, the prefix limit may be encoded as an Optional Capability Parameter in an OPEN message with which the BGP receiver advertises its capabilities. If the BGP speaker does not support the capability of prefix limit, it may send a NOTIFICATION message with an appropriate error code and sub-code. The BGP receiver may then re-initiate the peering session without this capability. If the BGP speaker does support the capability of prefix limit exchange, it may store the information of the prefix limit of the BGP receiver.

At step 104, the BGP speaker may advertise routes to the BGP receiver. The BGP speaker may select, from the routes it has received and stored, the routes for advertisement to the BGP receiver in a number of ways. For example, the BGP speaker may follow a pre-configured policy to process the routes it receives on a first-come-first-served basis. That is, those routes that come in first may be advertised first. In addition, if the BGP receiver has negotiated with the BGP speaker one or more route filters to indicate its preferred routes, the BGP speaker may subject the route advertisement to the negotiated route filters. This may ensure that the BGP receiver gets the route(s) it prefers within its advertised prefix limit.

At step 106, the BGP speaker may record the number of routes it has effectively advertised to the BGP receiver. The advertised routes may include both feasible routes and route withdrawals that are typically encoded in an UPDATE message. Each time the BGP speaker advertises route(s) to the BGP receiver, the number may be updated. For example, if a feasible route is advertised, the number may be incremented. If a withdrawn route is advertised, the number may be decremented.

At step 108, it may be determined if the prefix limit of the BGP receiver has been reached. If the number of routes advertised to the BGP receiver is the same or greater than its prefix limit, the process may proceed to step 110. Otherwise, the process may loop back to step 104 where more routes may be advertised to the BGP receiver.

At step 110, since the prefix limit of the BGP receiver has been reached, the BGP speaker may suspend route advertisement to the BGP receiver. When the prefix limit is reached, the BGP speaker's announce policy to the BGP receiver may be changed to "stop/deny". Also, certain alarms may be raised by the BGP speaker and/or the BGP receiver to alert their respective operators or administrators of the situation so that mutually agreed actions may be taken.

During the suspension, it may be determined, at step 112, whether there is any route withdrawal to the BGP receiver. If there is no route withdrawal, the suspension of route advertisement may be maintained. If there is at least one route withdrawal to the BGP receiver, the BGP speaker may automatically record it, at step 114, and restore the announce policy to a previous configuration. Then the process may loop back to step 104 where additional route(s) may be advertised.

The exemplary method ends at step 116.

As described above, by exchanging a prefix limit between two routing neighbors and subjecting the subsequent route advertisement to the conditions of the prefix limit, restarting of the peering session or re-advertising of any discarded routes may be avoided. This is achieved without the need of adding any new messages to the protocol.

Figure 2:
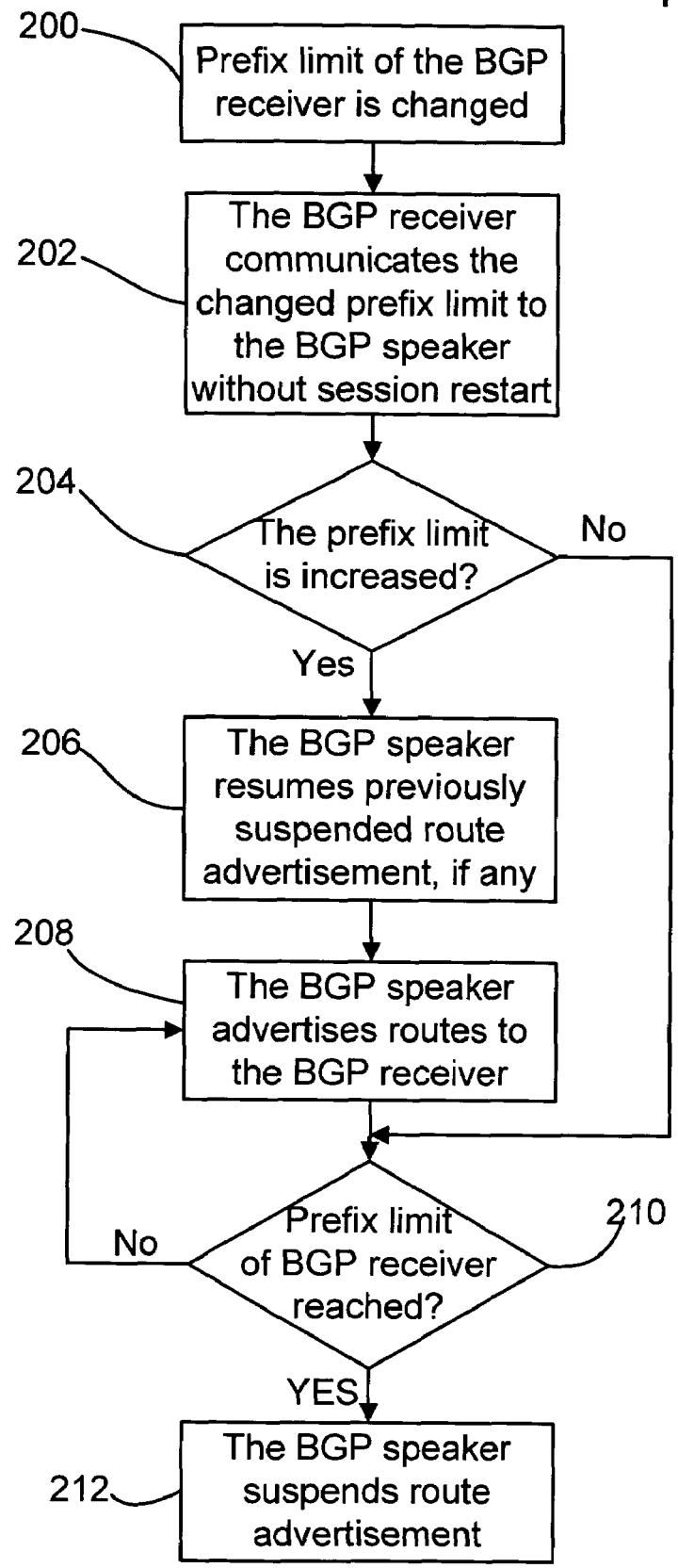
FIG. 2 is a flow chart illustrating another exemplary method for prefix limit exchange for route advertisement in accordance with the present invention.

Referring to FIG. 2, there is shown a flow chart illustrating another exemplary method for prefix limit exchange for route advertisement in accordance with the present invention. In connection with FIG. 2, exemplary processing steps in an event of a prefix limit change are described.

At step 200, the prefix limit of the BGP receiver may be changed. The prefix limit configuration may have been changed for a number of reasons. For example, system hardware and software of the BGP receiver may have been modified or upgraded therefore its processing capacity may have changed. Or customers of the internet service provider (ISP) may be paying more or less for the routing service. As a result of different factors, the prefix limit of the BGP receiver may have increased or decreased.

At step 202, the BGP receiver may dynamically communicate the changed prefix limit to the BGP speaker without restarting the BGP peering session. For example, this may be accomplished by encoding the changed value as an Optional Capability Parameter in an OPEN message.

At step 204, it may be determined whether the prefix limit has been increased.

If the prefix limit has indeed been increased, the BGP speaker may, at step 206, resume the previously suspended route advertisement, if any, to the BGP receiver. If the route advertisement has not been suspended due to a previously reached prefix limit, the BGP speaker may take a note of the increased prefix limit, continue processing the routes at step 208, and then move on to step 210.

If it is determined at step 204 that the prefix limit has been decreased, the process will proceed directly to step 210.

At step 210, it may be determined whether the changed prefix limit of the BGP receiver has been reached. If the number of routes the BGP speaker has advertised to the BGP receiver is the same or greater than the changed prefix limit, the BGP speaker may suspend the route advertisement at step 212. If the changed prefix limit has not yet been reached, the BGP speaker may continue advertising routes to the BGP receiver at step 208 until such limit is reached.

It should be noted that the communication of a changed prefix limit and any subsequent actions do not require the BGP session to be restarted or reset. Therefore, a change of prefix limit in accordance with the present invention will not disrupt network services.

Figure 3:
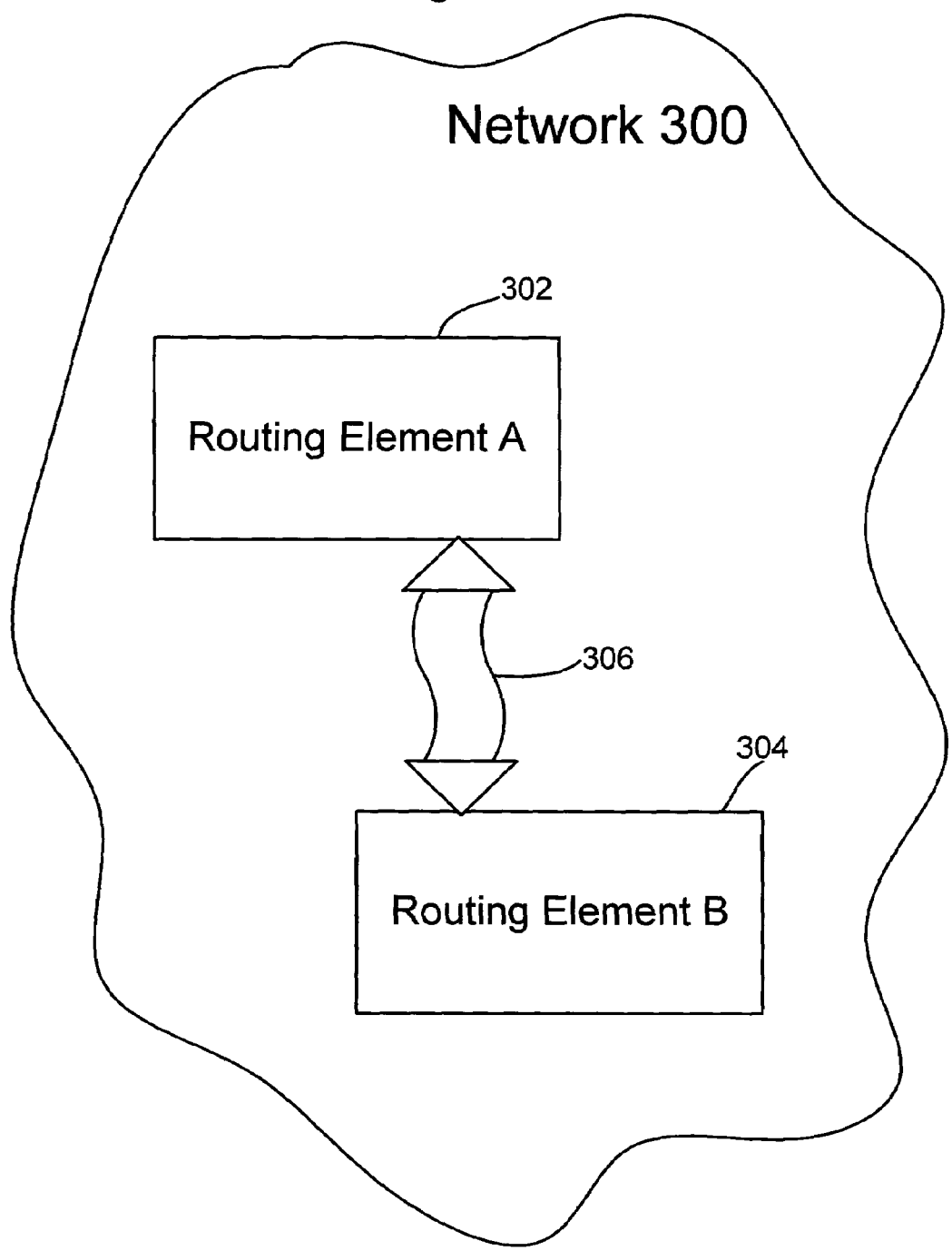
FIG. 3 is a block diagram illustrating an exemplary system for prefix limit exchange for route advertisement in accordance with the present invention.

Referring to FIG. 3, there is shown a block diagram illustrating an exemplary system for prefix limit exchange for route advertisement in accordance with the present invention. The exemplary system comprises a Routing Element A 302 and a Routing Element B 304 that are two routing neighbors in a Network 300. Network 300 may be a computer and/or communications network that comprises a plurality of network elements, of which only Routing Element A and Routing Element B are shown in FIG. 3. Routing Element A and Routing Element B may each be a router, processor or network server that has communication means, storage means and processing means. There may be a network connection 306 between Routing Element A and Routing Element B. When a peering session is set up between these two routing neighbors, Routing Element A may communicate its own prefix limit to Routing Element B. Routing Element B may record that prefix limit and then start advertising routes to Routing Element A. At the same time, Routing Element B may record a number of effective routes it has advertised to Routing Element A. A feasible route may increment the number and a withdrawn route may decrement the number. When the prefix limit is reached, Routing Element B may suspend the route advertisement to Routing Element A. If there comes a route withdrawal to Routing Element A, the route advertisement may be resumed. If the prefix limit of Routing Element A is changed. it may be communicated to Routing Element B and appropriate actions may be taken in response to the change, as exemplarily described in connection with FIG. 2.

At this point it should be noted that the technique for prefix limit exchange for route advertisement in accordance with the present invention as described above typically involves the processing of input data and the generation of output data to some extent. This input data processing and output data generation may be implemented in hardware or software. For example, specific electronic components may be employed in a computer and/or communications network or similar or related circuitry for implementing the functions associated with prefix limit exchange for route advertisement in accordance with the present invention as described above. Alternatively, one or more processors operating in accordance with stored instructions may implement the functions associated with prefix limit exchange for route advertisement in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method for prefix limit exchange for route advertisement, the method comprising:
   communicating a prefix limit from a first element to a second element, wherein the first element and the second element are routing neighbors in a network;
   advertising a plurality of routes from the second element to the first element;
   recording, at the second element, a number of the plurality of routes that the second element has advertised to the first element; and
   suspending route advertisement from the second element to the first element when the number is the same as or greater than the prefix limit.

2. The method according to claim 1 further comprising exchanging a prefix limit capability between the first element and the second element.

3. The method according to claim 1 further comprising:
   recording, at the second element, at least one route withdrawal to the first element;
   updating, based on the at least one route withdrawal, the number of the plurality of routes that the second element has advertised to the first element; and
   resuming the route advertisement from the second element to the first element.

4. The method according to claim 1 further comprising:
   communicating an increased prefix limit from the first element to the second element without resetting a peering session between the first element and the second element; and
   resuming the route advertisement from the second element to the first element until the number of the plurality of routes that the second element has advertised to the first element is the same as or greater than the increased prefix limit.

5. The method according to claim 1 further comprising:
   communicating a decreased prefix limit from the first element to the second element without resetting a peering session between the first element and the second element; and
   suspending the route advertisement from the second element to the first element when the number of the plurality of routes that the second element has advertised to the first element is the same as or greater than the decreased prefix limit.

6. The method according to claim 1 further comprising subjecting the plurality of routes to one or more route filters negotiated between the first element and the second element.

7. The method according to claim 1, wherein the first element and the second elements are routing neighbors in a network implementing Border Gateway Protocol (BGP).

8. At least one processor readable carrier for storing a computer program of instructions configured to be readable by at least one processor for instructing the at least one processor to execute a computer process for performing the method as recited in claim 1.

9. A system for prefix limit exchange for route advertisement, the system comprising one or more devices comprising:
   means for communicating a prefix limit from a first element to a second element, wherein the first element and the second element are routing neighbors in a network;
   means for advertising a plurality of routes from the second element to the first element;
   means for recording, at the second element, a number of the plurality of routes that the second element has advertised to the first element; and
   means for suspending route advertisement from the second element to the first element when the number is the same as or greater than the prefix limit.

10. The system according to claim 9 further comprising means for exchanging a prefix limit capability between the first element and the second element.

11. The system according to claim 9 further comprising:
    means for recording, at the second element, at least one route withdrawal to the first element;
    means for updating, based on the at least one route withdrawal, the number of the plurality of routes that the second element has advertised to the first element; and
    means for resuming the route advertisement from the second element to the first element.

12. The system according to claim 9 further comprising:
    means for communicating an increased prefix limit from the first element to the second element without resetting a peering session between the first element and the second element; and
    means for resuming the route advertisement from the second element to the first element until the number of the plurality of routes that the second element has advertised to the first element is the same as or greater than the increased prefix limit.

13. The system according to claim 9 further comprising:
means for communicating a decreased prefix limit from the first element to the second element without resetting a peering session between the first element and the second element; and
means for suspending the route advertisement from the second element to the first element when the number of the plurality of routes that the second element has advertised to the first element is the same as or greater than the decreased prefix limit.

14. The system according to claim 9 further comprising means for subjecting the plurality of routes to one or more route filters negotiated between the first element and the second element.

15. The system according to claim 9, wherein the first element and the second elements are routing neighbors in a network implementing Border Gateway Protocol (BGP).

* * * * *